Jan. 5, 1932.         L. M. KEEFE         1,839,484
BLADE FOR WINDSHIELD WIPERS
Filed July 18, 1930

Inventor:
Lincoln M. Keefe.
by Charles L. Gooding,
Atty.

Patented Jan. 5, 1932

1,839,484

UNITED STATES PATENT OFFICE

LINCOLN M. KEEFE, OF BRIGHTON, MASSACHUSETTS, ASSIGNOR OF ONE-HALF TO KURT SCHORR, OF BOSTON, MASSACHUSETTS

BLADE FOR WINDSHIELD WIPERS

Application filed July 18, 1930. Serial No. 468,826.

This invention relates to improvements in windshield wipers and particularly to a blade therefor.

The object of the invention is to provide an improved blade for a windshield wiper embodying therein a container for an anti-freeze solution and a holder for a plurality of wiping elements, the container and holder being constructed of a single piece of sheet metal and one of the wiping elements being constructed of absorbent material and projecting into the container in such a manner that the solution therein will be absorbed by the wiper member and then distributed upon the windshield.

Another object of the invention is to so form the container and holder that the opposite side portions thereof will pinch the absorbent wiper member in such a manner that the progress of the solution therethrough will be retarded.

The invention consists in a blade for a windshield wiper as set forth in the following specification and particularly as pointed out in the claims thereof.

Referring to the drawings:—

Like numerals refer to like parts in the views of the drawings.

Figure 1:
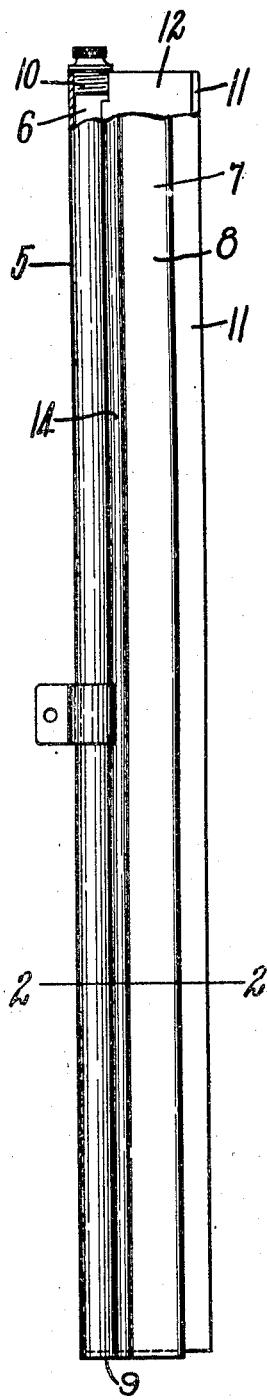
Fig. 1 represents a side elevation of a blade for a windshield wiper embodying my invention.
Figure 2:
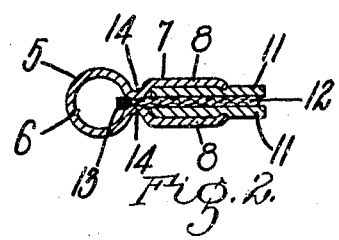
Fig. 2 is an enlarged transverse section taken on the line 2—2 of Fig. 1.

In the drawings, 5 represents a piece of sheet metal bent lengthwise thereof to form a cylindrical liquid container 6 and a holder 7 having parallel side flanges 8. The combined container and holder is closed at the bottom at 9 and the container portion is closed at the top thereof by means of a plug 10.

Mounted within the holder 7 are a pair of rubber wiper members 11 between which is a wiper member 12 comprising a strip of absorbent material preferably felt. The wiper members 11 and 12 are held securely in the holder 7 between the side flanges thereof and the outer edge portions of said flanges are bent inwardly slightly and grip the outer surfaces of the wiper members 11.

The interior of the container 5 communicates with the interior of the holder 7 through a slot 13 and the absorbent wiper member 12 projects through said slot into the interior of the container. Where the absorbent wiper member 12 projects through the slot 13 opposite side portions 14 of the container, which form the slot, pinch the opposite side portions of said wiper member and compress the same a sufficient amount to retard the progress of the anti-freeze solution as it passes through the wiper member, thereby preventing an excessive amount of said solution from passing through the wiper member.

It is evident that any desired number of wiper members may be mounted in the holder 7 as all that is necessary in order that the anti-freeze solution shall be properly distributed to an automobile windshield is that at least one of these wiper members shall be constructed of absorbent material and project into the container and also be pinched and compressed by the opposite sides of the container at the slot a sufficient amount to retard the progress of the solution therethrough and not permit an excessive amount of said solution to be distributed upon the windshield.

I claim:

1. A blade for a windshield wiper comprising, in combination, a container for liquid embodying therein a split tubular portion, a pair of flanges integral with said container and projecting laterally from the exterior thereof on opposite sides respectively of said split portion, said flanges being bent inwardly toward each other adjacent the split portion and constituting pressers, and a plurality of wiper members interposed between said flanges, one of said wiper members being constructed of absorbent material and projecting into said container and pinched between said pressers, whereby the passage of liquid therethrough is retarded.

2. A blade for a windshield wiper comprising, in combination, a container for liquid embodying therein a split tubular portion, a pair of flanges integral with said container and projecting laterally from the exterior thereof on opposite sides respectively of said split portion and terminating in inwardly bent outer edge portions, said flanges also being bent inwardly toward each other adjacent the split portion and constituting pressers, a plurality of wiper members interposed between said flanges, one of said wiper members being constructed of absorbent material and projecting into said container and pinched between said pressers, whereby the passage of liquid therethrough is retarded and all of said wiper members being gripped simultaneously between the outer edge portions of said flanges.

In testimony whereof I have hereunto set my hand.

LINCOLN M. KEEFE.